US012516608B2

(12) United States Patent
Alpan

(10) Patent No.: US 12,516,608 B2
(45) Date of Patent: Jan. 6, 2026

(54) PLATFORM FOR STATOR VANE

(71) Applicant: ROLLS-ROYCE plc, London (GB)

(72) Inventor: Bogachan Alpan, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 18/237,935

(22) Filed: Aug. 25, 2023

(65) Prior Publication Data
US 2024/0102396 A1 Mar. 28, 2024

(30) Foreign Application Priority Data
Sep. 22, 2022 (GB) .................................... 2213805

(51) Int. Cl.
F01D 9/04 (2006.01)
F01D 9/06 (2006.01)

(52) U.S. Cl.
CPC .............. *F01D 9/042* (2013.01); *F01D 9/06* (2013.01); *F05D 2240/81* (2013.01); *F05D 2260/213* (2013.01)

(58) Field of Classification Search
CPC . F01D 9/042; F01D 9/06; F01D 5/147; F01D 5/187; F01D 9/041; F05D 2240/81; F05D 2260/213; F05D 2230/21; F05D 2230/232; F05D 2230/237; F05D 2230/90; F05D 2260/202; F05D 2260/22141
See application file for complete search history.

(56) References Cited

U.S. PATENT DOCUMENTS

| 5,957,657 | A | 9/1999 | Akita et al. |
| 6,631,561 | B1 | 10/2003 | Anding et al. |
| 8,794,921 | B2 | 8/2014 | Ellis et al. |
| 10,054,055 | B2* | 8/2018 | Spangler ................... F01D 5/18 |
| 11,060,407 | B2 | 7/2021 | Brittingham |
| 2009/0081048 | A1 | 3/2009 | Beeck et al. |

(Continued)

FOREIGN PATENT DOCUMENTS

| CN | 102 465 717 A | 5/2012 |
| EP | 0 930 418 A2 | 7/1999 |

(Continued)

OTHER PUBLICATIONS

"Total Emissivity of Various Surfaces for Infrared Thermography", Transmetra, p. 2-10 (Year: 2025).*

(Continued)

Primary Examiner — Courtney D Heinle
Assistant Examiner — Eric A Lange
(74) Attorney, Agent, or Firm — Oliff PLC

(57) ABSTRACT

A platform for a stator vane includes a platform body and a plug. The platform body defines: an inner surface, an outer surface offset from the inner surface, an internal fluid passageway disposed between the outer surface and the inner surface, and a core aperture extending from the outer surface to the internal fluid passageway. The plug 700 is configured to be secured to the platform body. The plug is configured to be partially disposed inside the core aperture and extend outside of the core aperture whilst secured to the platform body for improved heat transfer between a fluid conveyed by the internal fluid passageway and a fluid to which the outer surface is exposed.

21 Claims, 12 Drawing Sheets

(56) References Cited

U.S. PATENT DOCUMENTS

| | | | |
|---|---|---|---|
| 2010/0162715 A1* | 7/2010 | Nagaraj | C23C 28/322 |
| | | | 60/752 |
| 2011/0058957 A1 | 3/2011 | Von Arx et al. | |
| 2012/0082566 A1* | 4/2012 | Ellis | F01D 5/187 |
| | | | 29/889.721 |
| 2012/0328451 A1* | 12/2012 | Lomas | F01D 5/187 |
| | | | 29/889.721 |
| 2016/0222786 A1 | 8/2016 | Kuwabara | |
| 2018/0200783 A1 | 7/2018 | Takamura et al. | |
| 2018/0274371 A1 | 9/2018 | Takamura et al. | |
| 2018/0311740 A1 | 11/2018 | Morgan et al. | |
| 2018/0371921 A1 | 12/2018 | Brittingham | |
| 2019/0284939 A1 | 9/2019 | Singh | |
| 2021/0087942 A1 | 3/2021 | Kulinski et al. | |
| 2021/0215051 A1 | 7/2021 | Koenig et al. | |

FOREIGN PATENT DOCUMENTS

| | | |
|---|---|---|
| EP | 1 355 040 A2 | 10/2003 |
| EP | 2 540 971 A1 | 1/2013 |
| EP | 3 543 465 A1 | 9/2019 |
| WO | WO-2020046359 A1 * | 3/2020 |

OTHER PUBLICATIONS

"Inconel alloy 718", Sep. 2007, Special Metals, Pub. No. SMC-045 (Year: 2007).*

Jan. 19, 2024 Office Action issued in U.S. Appl. No. 18/237,938.

Jan. 31, 2024 Extended Search Report issued in European Patent Application No. 23192551.2.

Mar. 20, 2023 Search Report issued in British Patent Application No. 2213804.4.

Mar. 20, 2023 Search Report issued in British Patent Application No. 2213805.1.

U.S. Appl. No. 18/237,938, filed Aug. 25, 2023 in the name of Bogachan Alpan.

Jan. 31, 2024 Extended Search Report issued in European Patent Application No. 23192552.0.

Apr. 8, 2024 Office action issued in U.S. Appl. No. 18/237,938.

Jul. 15, 2025 Notice of Allowance received in U.S. Appl. No. 18/237,938.

Nov. 1, 2024 Office Action issued in U.S. Appl. No. 18/237,938.

* cited by examiner

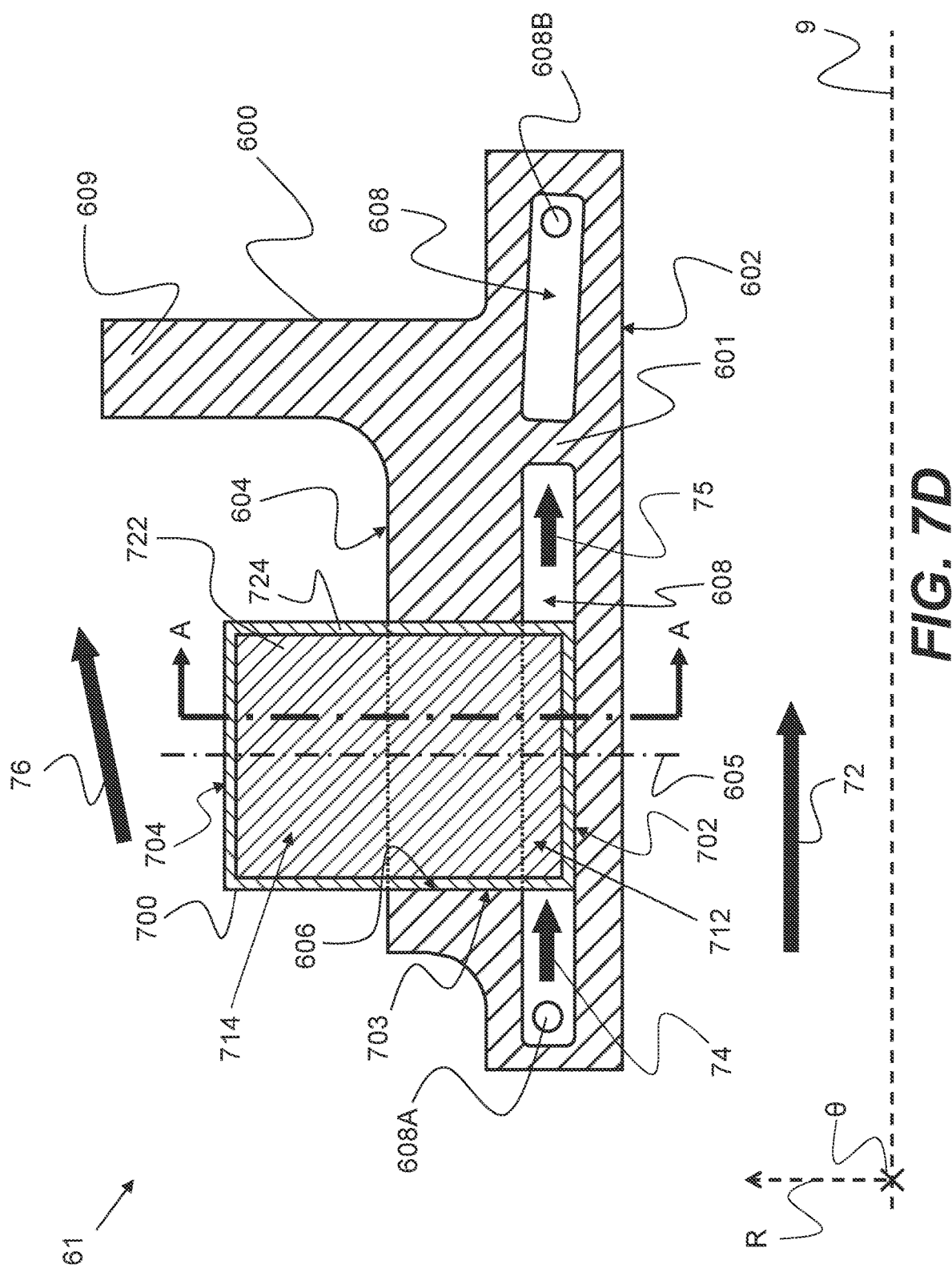

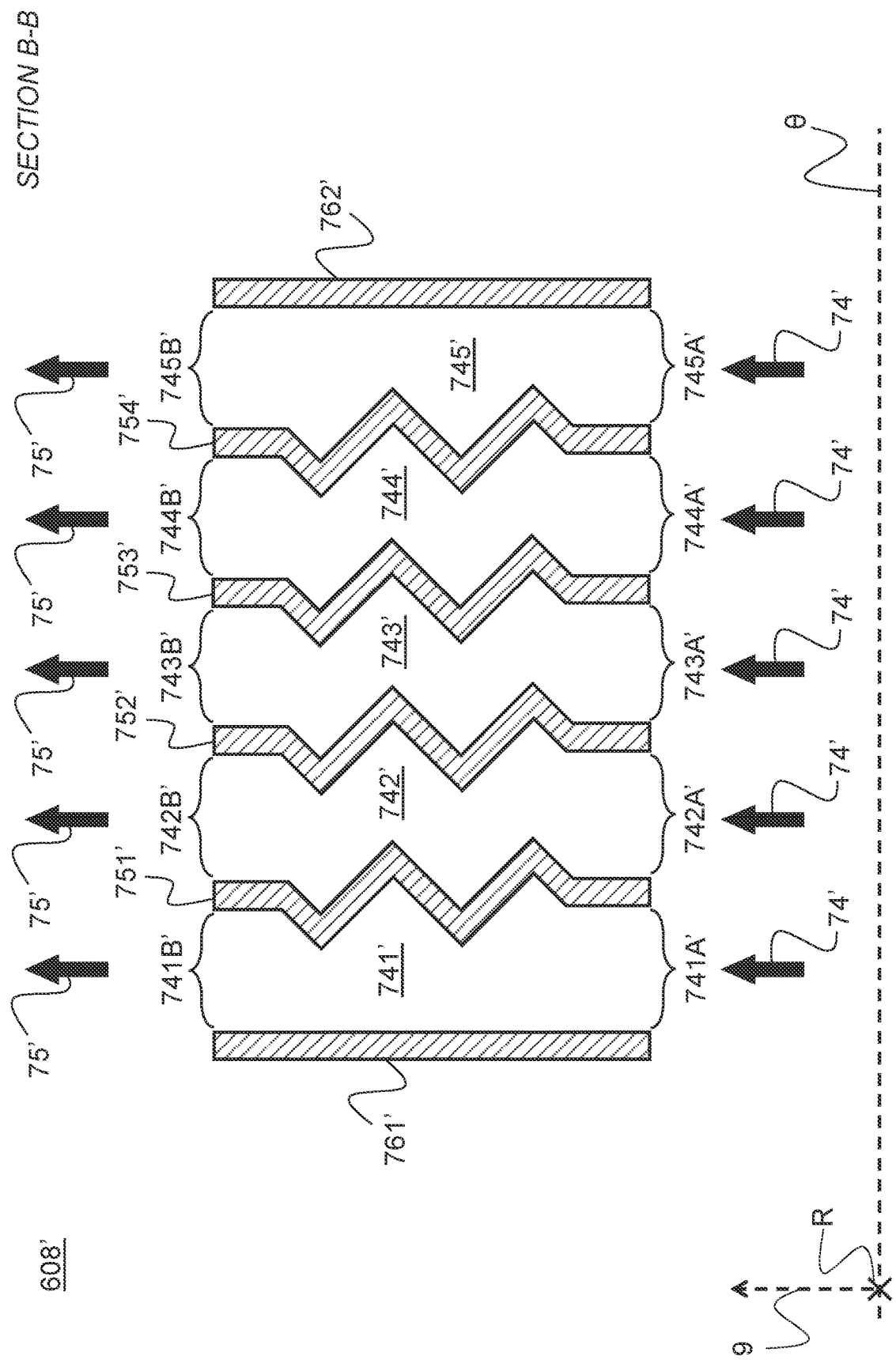

PLATFORM FOR STATOR VANE

This disclosure claims the benefit of UK Patent Application No. GB 2213805.1, filed on 22 Sep. 2022, which is hereby incorporated herein in its entirety.

TECHNICAL FIELD

The present disclosure concerns a platform for a stator vane suitable for use within a rotary machine. It further concerns a stator vane for a rotary machine, the stator vane comprising an aerofoil fixed to a platform.

BACKGROUND

A rotary machine (such as a turbomachine) may include at least one stator vane. The stator vane may be utilised as part of a compressor stage or a turbine stage of a rotary machine. The stator vane may comprise a platform and an aerofoil. If configured for use within a turbine stage of a rotary machine, the aerofoil is adapted to convert static pressure energy and/or heat energy of air passing through the turbine stage into kinetic energy. On the other hand, if configured for use within a compressor stage of a rotary machine, the aerofoil is adapted to convert kinetic energy and/or heat energy of air passing through the compressor stage into static pressure energy. The platform is configured to hold the aerofoil in place with respect to a frame of reference of the respective stage.

For better operation of a rotary machine, it is desirable to provide an improved stator vane for use therein, and in particular to provide an improved platform for a stator vane.

SUMMARY

According to a first aspect of the present disclosure, there is provided a platform for a stator vane, the platform including a platform body and a plug, and wherein the platform body defines: an inner surface, an outer surface offset from the inner surface, an internal fluid passageway disposed between the outer surface and the inner surface, and a core aperture extending from the outer surface to the internal fluid passageway; wherein the plug is configured to be secured to the platform body; and wherein the plug is configured to be partially disposed inside the core aperture and extend outside of the core aperture whilst secured to the platform body for improved heat transfer between a fluid conveyed by the internal fluid passageway and a fluid to which the outer surface is exposed.

The core aperture may be formed as a result of casting of the platform body over a supporting structure. It may be that a lower portion of the plug is configured to extend into the internal fluid passageway whilst secured to the platform body to facilitate heat reception from the fluid conveyed by the internal fluid passageway. The lower portion of the plug may define a plurality of heat exchange channels for improved heat exchange between the fluid conveyed by the internal fluid passageway and the plug. In addition, or instead, it may be that an upper portion of the plug is configured to extend away from the outer surface of the platform body whilst the plug is secured to the platform body to facilitate heat rejection to the fluid to which the outer surface of the platform body is exposed.

An effective thermal conductivity of the plug may be greater than an effective thermal conductivity of the platform body. It may be that the effective thermal conductivity of the plug is no less than 50 W m$^{-1}$ K$^{-1}$ at 293 K and at atmospheric pressure. Further, it may be that the effective thermal conductivity of the plug is no less than 100 W m$^{-1}$ K$^{-1}$ at 293 K and at atmospheric pressure. In addition, or instead, it may be that: the plug comprises a plug body; the plug body is coated with a thermal coating. An effective thermal conductivity of the thermal coating may be greater than an effective thermal conductivity of the plug body. It may be that the effective thermal conductivity of the thermal coating is no less than 100 W m$^{-1}$ K$^{-1}$ at 293 K and at atmospheric pressure. Further, it may be that the effective thermal conductivity of the thermal coating is no less than 200 W m$^{-1}$ K$^{-1}$ at 293 K and at atmospheric pressure. An effective thermal emissivity of the thermal coating may be greater than an effective thermal emissivity of the plug body. It may be that the effective thermal emissivity of the thermal coating is no less than 0.05, and optionally no less than 0.1 or no less than 0.8.

The plug may be configured to occupy no less than 50% of the core aperture by volume whilst secured to the platform body to at least partially eliminate recirculation of the fluid conveyed by the internal fluid passageway within the core aperture. Further, the plug may be configured to occupy no less than 75% of the core aperture by volume.

It may be that the plug is configured to be fixed to the platform body and to seal the core aperture. It may also be that the plug is configured to be fixed to the platform body by a welded joint or a brazed joint. Additionally, or alternatively, it may be that the plug is configured to be fixed to the platform body by an interference fit between interfering surfaces of the plug and the core aperture. It may be that a sealant is disposed between the interfering surfaces of the plug and the platform body.

It may be that the platform includes a further plug, and the platform body defines: a further internal fluid passageway disposed between the outer surface and the inner surface, and a further core aperture extending from the outer surface to the further internal fluid passageway; the further plug is configured to be secured to the platform body and seal the further core aperture; and the further plug is configured to be partially disposed inside the further core aperture and partially disposed outside the further core aperture whilst secured to the platform body for improved heat transfer between a fluid conveyed by the further internal fluid passageway and the fluid to which the outer surface of the platform body is exposed.

It may be that the further plug is configured to be fixed to the platform body and to seal the further core aperture. It may also be that the further plug is configured to be fixed to the platform body by a welded joint or a brazed joint. Additionally, or alternatively, it may be that the further plug is configured to be fixed to the platform body by an interference fit between interfering surfaces of the further plug and the further core aperture. It may be that a sealant is disposed between the interfering surfaces of the further plug and the platform body. It may also be that the plug and the further plug are joined by a bridging portion to form a combined plug structure.

According to a second aspect of the present disclosure, there is provided a stator vane comprising an aerofoil fixed to the platform of the first aspect. According to a third aspect of the present disclosure, there is provided a turbine stage for a gas turbine engine, the turbine stage comprising the platform of the first aspect or the stator vane of the second aspect. According to a fourth aspect of the present disclosure, there is provided a gas turbine engine comprising the platform of the first aspect, the stator vane of the second aspect or the turbine stage of the third aspect, wherein the internal fluid passageway is configured to convey air received from a compressor stage of the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a gas turbine engine as described and/or claimed herein.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which:

FIGS. 7A-7F are detail views of various example platforms suitable for use within the high-pressure turbine of FIG. 4 and/or the stator vane of FIG. 5.

DETAILED DESCRIPTION

Figure 1:
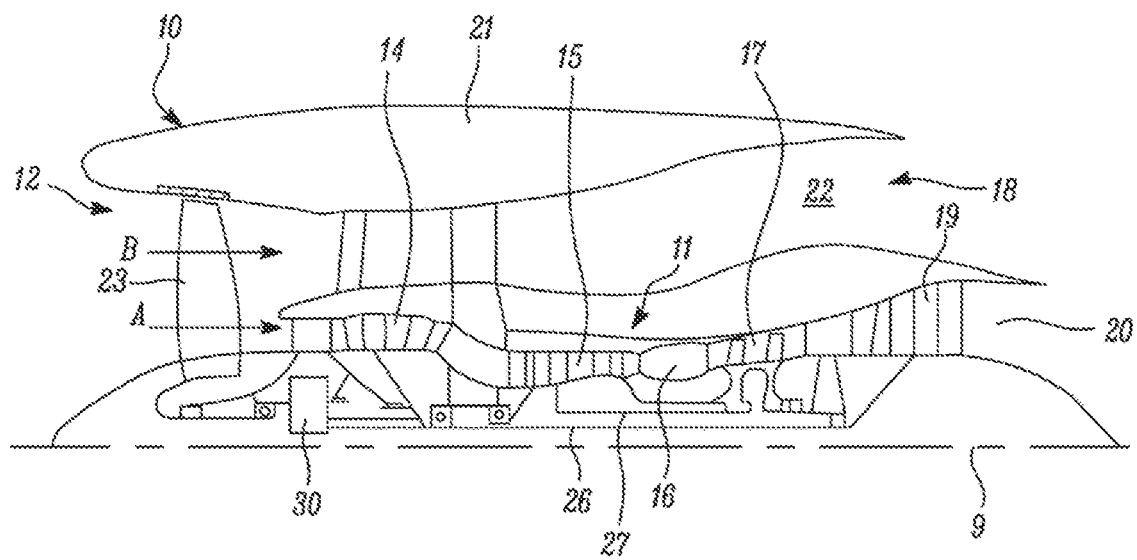
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
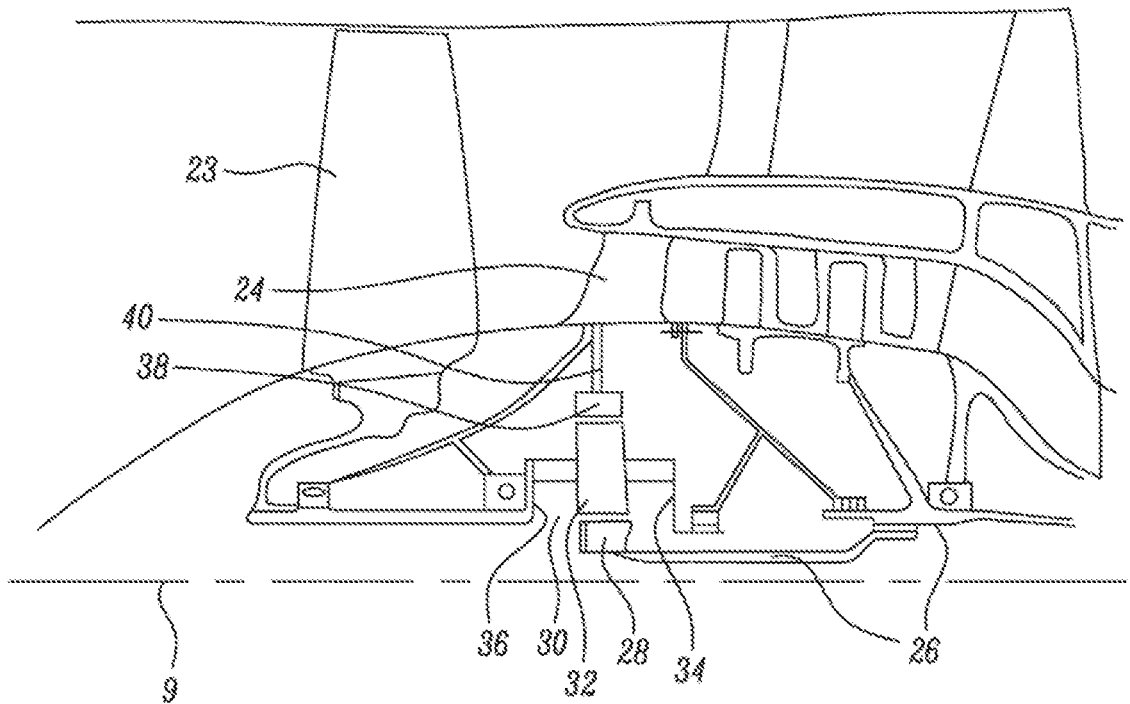
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
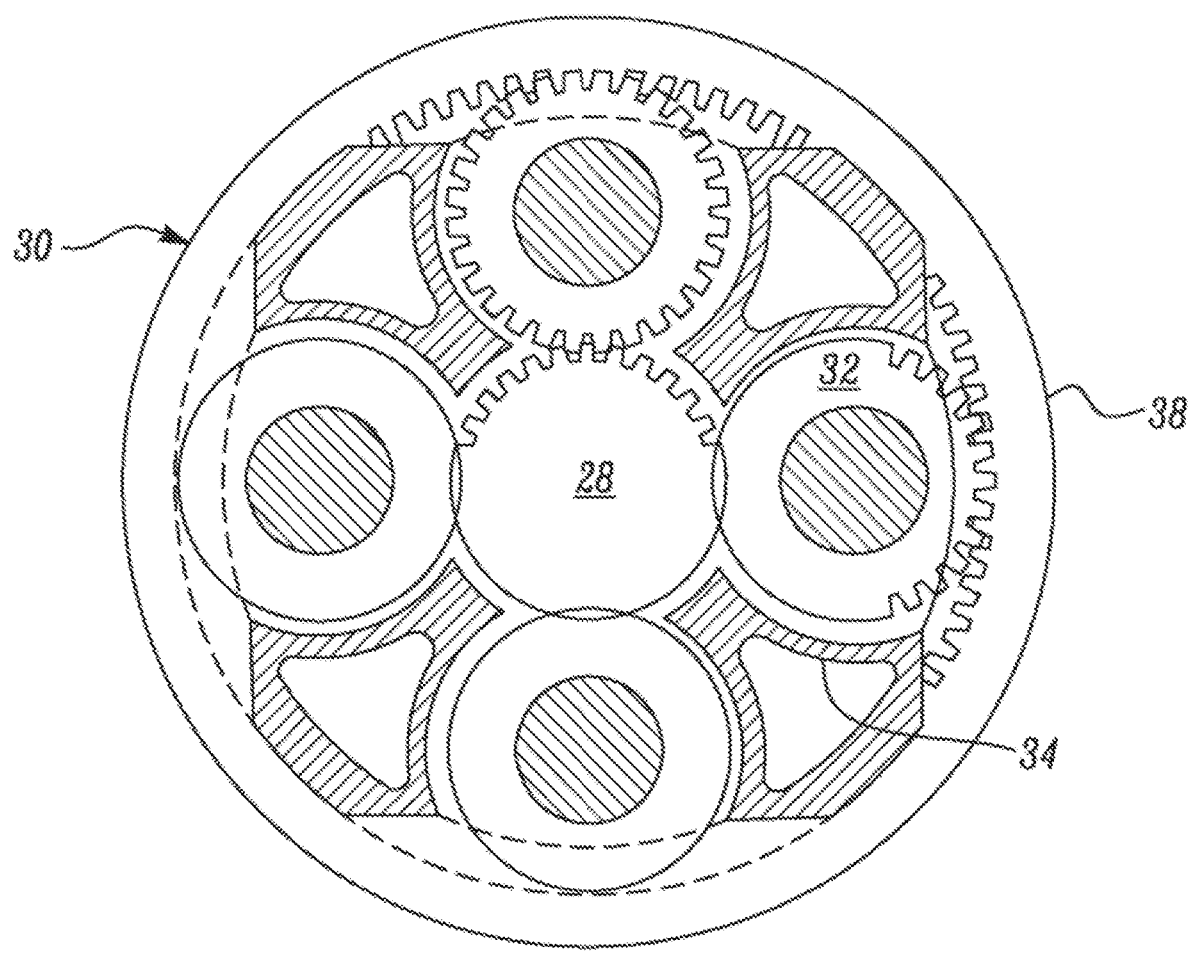
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
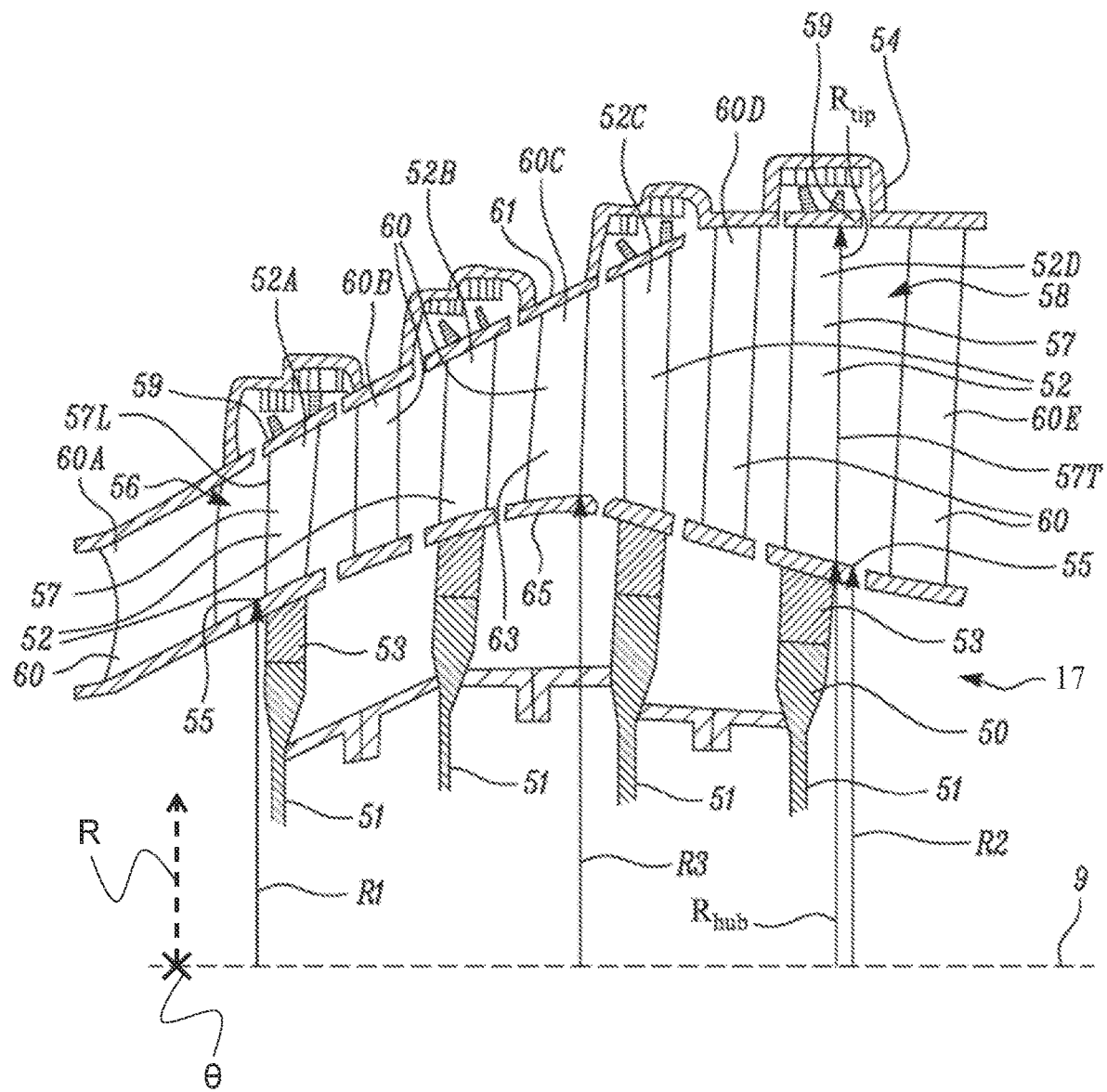
FIG. 4 is an enlarged cross-sectional view through the high-pressure turbine of the gas turbine engine shown by FIGS. 1-3.

FIG. 4 shows the high-pressure turbine 17 of the gas turbine engine 10 in more detail. As mentioned above the high-pressure turbine 17 is arranged to drive the high-pressure compressor 15 via the shaft 27. The high-pressure turbine 17 is arranged to extract power from the hot combustion products in order to drive the high-pressure compressor 15 via the shaft 27. The high-pressure turbine 17 is arranged to produce a high-pressure ratio between the inlet and the outlet of the high pressure turbine 17 and thus the high pressure turbine 17 has a high ratio between the area of the outlet to the area of the inlet of the high pressure turbine 17. The high-pressure turbine 17 comprises a turbine rotor 50 and a plurality of stages of axially spaced turbine rotor blades 52A, 52B, 52C and 52D mounted on the turbine rotor 50. The turbine rotor 50 comprises a plurality of turbine discs 51 which have axially extending flanges which are secured together by bolted connections. The turbine rotor 50 and turbine rotor blades 52 are surrounded by a turbine casing 54. The high-pressure turbine 17 has an inlet 56 defined at an upstream end of a first stage of turbine rotor blades 52A and an outlet 58 defined at a downstream end of a last stage of turbine rotor blades 52D.

Each turbine rotor blade 52 comprises a root 53, a platform 55, an aerofoil 57 and a shroud 59. The root 53 extends in a first direction, radially inward direction, from the platform 55 and the aerofoil 57 extends a second opposite direction, radially outward direction, from the platform 55 and the shroud 59 is remote from the root 53 and platform 55. The roots 53 of the turbine rotor blades 52 are located in slots in the rim of the corresponding turbine disc 51. The inlet 56 is defined between the platforms 55 and the shrouds 59 of the first stage of turbine rotor blades 52A and the outlet 58 is defined between the platforms 55 and the shrouds 59 of the last stage of turbine rotor blades 52D. Thus, the inlet 56 is an annular inlet and is defined radially between the platforms 55 and the shrouds 59 of the first stage of turbine rotor blades 52A. Similarly, the outlet 58 is an annular outlet and is defined radially between the platforms 55 and the shrouds 59 of the last stage of turbine rotor blades 52D.

The aerofoils 57 of the turbine rotor blades 52 have leading edges 57L and trailing edges 57T and the inlet 56 is defined between the platforms 55 and the shrouds 59 of the first stage of turbine rotor blades 52A at the axial position where the leading edges 57L of the aerofoils 57 of the turbine rotor blades 52 intersect the platforms 55 and the shrouds 59 of the first stage of turbine rotor blades 52A and the outlet 58 is defined between the platforms 55 and the shrouds 59 of the last stage of turbine rotor blades 52D at the axial position where the trailing edges 57T of the aerofoils 57 of the turbine rotor blades 52 intersect the platforms 55 and the shrouds 59 of the last stage of turbine rotor blades 52D.

The radial direction, R, and the circumferential direction, θ, are also shown on FIG. 4. The upstream ends of the platforms 55 of the first stage of turbine rotor blades 52A are arranged at a first radius R1, the downstream ends of the platforms 55 of the last stage of turbine rotor blades 52D are arranged at a second radius R2 and the second radius R2 is greater than the first radius R1. Each radius is measured in the radial direction R. However, in other arrangements the second radius R2 is equal to the first radius R1 or the second radius R2 is less than the first radius R1. The ratio of the first radius R1 to the second radius R2 may be greater than or equal to 0.8 and less than or equal to 1.17. Also on FIG. 4, a hub radius of the last stage of turbine rotor blades 52D is marked as $R_{hub}$, while a tip radius of the last stage of turbine rotor blades 52D is marked as $R_{tip}$.

The high-pressure turbine 17 also comprises a plurality of axially spaced stages of turbine stator vanes 60A, 60B, 60C and 60D and each turbine stator vane 60 comprises an outer platform 61, an aerofoil 63 and an inner platform 65. A first stage of turbine stator vanes 60A is arranged upstream of the first stage of turbine rotor blades 52A and a last stage of turbine stator vanes 60D is arranged upstream of the last stage of turbine rotor blades 52D. An intermediate stage of turbine stator vanes 60C is arranged downstream of the first stage of turbine stator vanes 60A and upstream of the last stage of turbine stator vanes 60D. The inner platforms 65 of the intermediate stage of turbine stator vanes 60D have a third radius R3 and the third radius R3 is greater than or equal to the first radius R1 and is greater than the second radius R2. The ratio of the third radius R3 to the first radius R1 is greater than or equal to 1 and less than or equal to 1.3. The ratio of the second radius R2 to the third radius R3 is greater than or equal to 0.8 and less than or equal to 0.95. The ratio of the third radius R3 to the first radius R1 is greater than or equal to 1.05 and less than or equal to 1.3 and the ratio of the second radius R2 to the third radius R3 is greater than or equal to 0.8 and less than 0.95.

In this arrangement the third radius R3 is greater than the first radius R1, the third radius R3 is greater than the second radius R2 and the second radius R2 is greater than the first radius R1. However, in another arrangement the third radius R3 is greater than the first radius R1, the third radius R3 is greater than the second radius R2 and the second radius R2 is equal to the first radius R1. However, in a further arrangement the third radius R3 is equal to the first radius R1, the third radius R3 is greater than the second radius R2 and the second radius R2 is less than the first radius R1.

In this example there are four stages of turbine rotor blades 50A, 50B, 50C and 50D and four stages of turbine stator vanes 60A, 60B, 60C and 60D, the intermediate stage of turbine stator vanes 60C is the third stage of turbine stator vanes, but the intermediate stage of stator vanes may be the second stage of turbine stator vanes. However, in other arrangements there may be three stages of turbine rotor blades and three stages turbine stator vanes and the intermediate stage of turbine stator vanes is the second stage of turbine stator vanes or there may be five stages of turbine rotor blades and five stages of turbine stator vanes and the intermediate stage of turbine stator vanes is the second stage of turbine stator vanes, the third stage of turbine stator vanes or the fourth stage of turbine stator vanes. The high-pressure turbine 17 also comprises a stage of turbine outlet guide vanes 60E positioned axially downstream of the last stage of turbine rotor blades 52D.

The turbine rotor blades 52 and the turbine stator vanes 54 may comprise an intermetallic material. The turbine rotor blades 52 and the turbine stator vanes 60 may comprise titanium aluminide and in particular the turbine stator blades 52 and the turbine stator vanes 60 may comprise gamma titanium aluminide.

Figure 5:
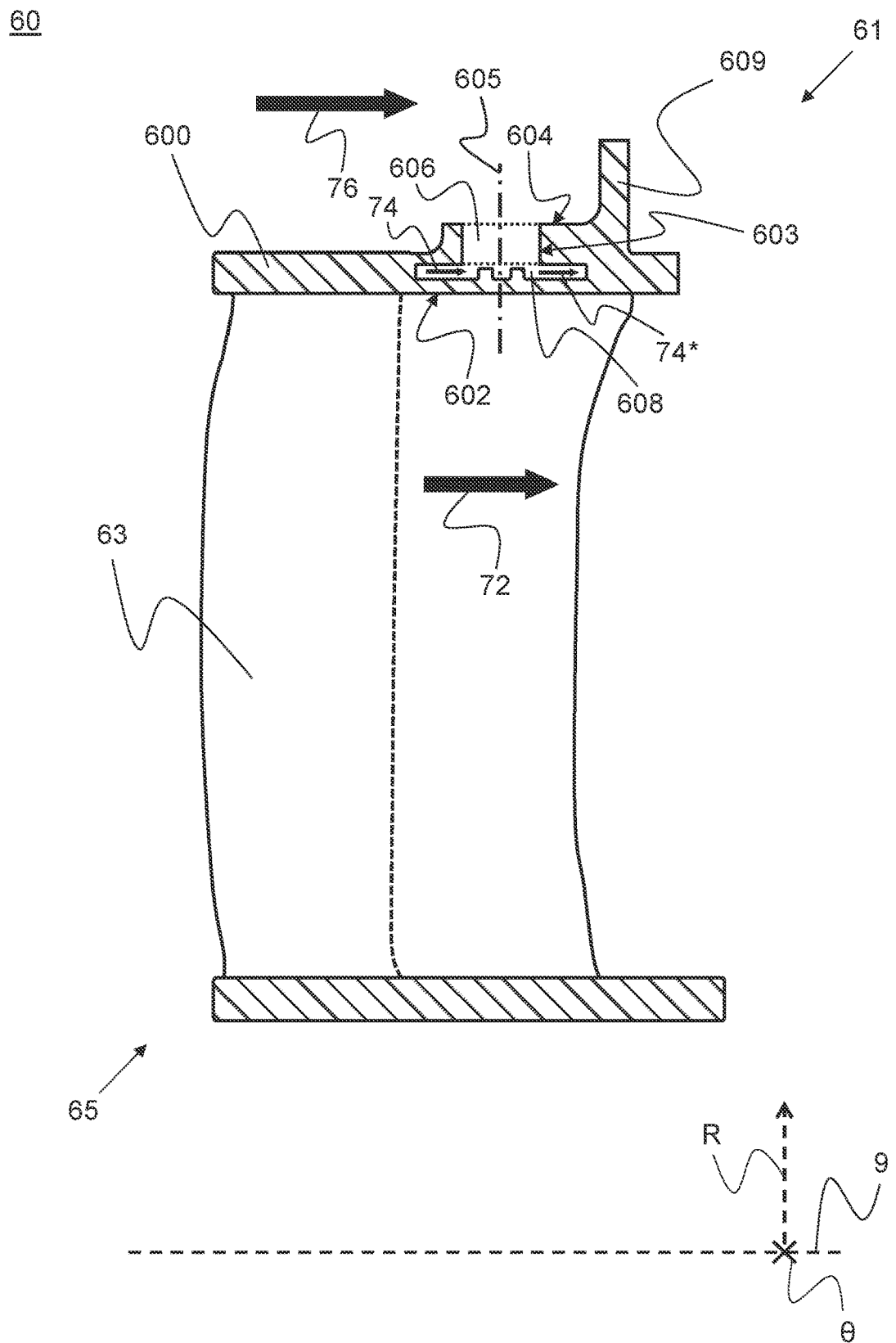
FIG. 5 is a detail view of a stator vanes of the high-pressure turbine shown by FIG. 4.

FIG. 5 shows one of the stator vanes 60 of the high-pressure turbine 17 shown by FIG. 4 in further detail, with like reference signs denoting common features. The aerofoil 63 extends between the outer platform 61 and the inner platform 65 along the radial direction R. The aerofoil 63 is fixed to the outer platform 61 at an outer end of the aerofoil 63 and to the inner platform 65 at an inner end of the aerofoil 63. The aerofoil 63 may be fixed to the inner platform 65 and the outer platform 61 using any suitable fixing means, as will be apparent to those skilled in the art. Because the stator vane 60 is configured for use within the high-pressure turbine 17 shown by FIG. 4, the aerofoil 63 is adapted to convert static pressure energy and/or heat energy of air passing through the high-pressure turbine 17 into kinetic energy. Each platform 61, 65 is configured to hold the aerofoil 63 in place with respect to a frame of reference of the high-pressure turbine 17.

It should be appreciated that the stator vane 60 and each of its constituent components are suitable for use in various types of rotary machines and is not limited to use in the context of a high-pressure turbine or a gas turbine engine. In particular, if the stator vane 60 is configured for use within a compressor stage of a rotary machine, the aerofoil 63 is adapted to convert kinetic energy and/or heat energy of air passing through the compressor stage into static pressure energy.

The outer platform 61 includes a platform body 600. The platform body 600 defines an inner surface 602 and an outer surface 604. The outer surface 604 is offset from the inner surface 602, such that the inner surface is radially proximal to the rotational axis 9 when incorporated within a rotary machine, whereas the outer surface is radially distal from the rotational axis (e.g., is disposed radially outward of the inner surface). The platform body 600 also defines an internal fluid passageway 608 which is disposed between the outer surface 604 and the inner surface 602. In addition, the platform body 600 defines a core aperture 606 which extends from the outer surface 604 to the internal fluid passageway 608. During a manufacturing process of the platform 61, the internal fluid passageway 608 is formed by casting the platform body 600 over a ceramic core. The geometry of the ceramic core corresponds to the geometry of the internal fluid passageway 608. During the process of casting the platform body 600 over the ceramic core, the ceramic core is held in position by a supporting structure which extends through the platform body 600 from the outer surface 604 to the ceramic core. This may ensure more precise and accurate formation of the internal fluid passageway 608. Both the ceramic core and the supporting structure are then removed by a leaching process in which the ceramic core and the supporting structure are dissolved using an appropriate solvent.

The existence of the ceramic core during the casting process and the subsequent removal of the ceramic core during the leaching process leads to the formation of the internal fluid passageway 608 within the platform body 600. Similarly, the existence of the supporting structure during the casting process and the subsequent removal of the supporting structure during the leaching process leads to the formation of the core aperture 606 (also referred to as a core print or a core exit) within the platform body 600. The core aperture 606 has a geometrical centreline 605 and an internal perimeter 603.

In use, the inner surface 602 of the platform body 600 is exposed to a fluid (i.e. a gas) inside the high pressure turbine 17. The fluid (i.e., the gas) flows over the inner surface 602 of the platform body 600 along a direction indicated by arrow 72. The gas within the high-pressure turbine 17 comprises hot combustion products received from the combustion equipment 16 as discussed above. By virtue of containing the hot combustion products, the gas inside the high-pressure turbine 17 has a significantly higher temperature than the gas (e.g., the air) leaving the high-pressure compressor 15. The inner surface 602 of the platform body 600 may therefore be referred to as a hotter gas washed side 602 of the platform body 600.

The high temperature gas 72 inside the high-pressure turbine 17 heats the platform body 600 by convection at the inner surface 602. The internal fluid passageway 608 is generally configured to convey a fluid therethrough along a direction indicated by arrows 74 and 75 for the purpose of heat exchange with the platform body 600. The fluid conveyed by the internal fluid passageway 608 upstream of the core aperture 606 is denoted by arrow 74, whereas the fluid conveyed by the internal fluid passageway 608 downstream of the core aperture 606 is denoted by arrow 75. The fluid 74, 75 conveyed by the internal fluid passageway 608 is cooler than the high temperature gas inside the high-pressure turbine 17, such that heat is received into the platform body 600 from the gas within the high-pressure turbine 17 at the inner surface 602 and subsequently received into the fluid conveyed by the internal fluid passageway 608. Accordingly, the fluid 74, 75 conveyed by the internal fluid passageway 608 has a cooling effect on the platform body 600.

In use, the outer surface 604 of the platform body 600 is exposed to a fluid (i.e., a gas) outside the high-pressure turbine 17. In some examples, the fluid (i.e., the gas) flows over the outer surface 604 of the platform body 600 along a direction indicated by arrow 76. In other examples, the fluid (i.e., the gas) may be substantially stationary proximal to the outer surface 604 of the platform body 600. The gas outside the high-pressure turbine 17 may typically be air which has not passed through the combustion equipment 16 a gas turbine engine in which the platform 61 is incorporated. Specifically, the gas outside the high-pressure turbine 17 may be air received from a compressor or a bypass duct of the gas turbine engine (e.g., the low-pressure compressor 14, the high-pressure compressor 15 or the bypass duct 22 of the gas turbine engine 10 described above with reference to FIGS. 1-3). Otherwise, the gas outside the high-pressure turbine 17 may simply be ambient air which is contained within a sealed chamber (e.g., turbine housing or casing) around the high-pressure turbine 17. By virtue of not containing any hot combustion products, the gas outside the high-pressure turbine 17 has a significantly lower temperature than the gas inside the high-pressure turbine 17. The outer surface 604 of the platform body 600 may therefore be referred to as a cooler-gas side 604 of the platform body 600.

The low temperature gas outside the high-pressure turbine 17 may cool the platform body 600 by convection at the outer surface 604 (e.g. free convection if the gas is substantially stationary proximal to the outer surface 604 or forced convection if the gas flows over the outer surface 604). The fluid to which the outer surface 604 is exposed is cooler than both the fluid 74, 75 conveyed by the internal fluid passageway 608 and the high temperature gas 72 inside the high-pressure turbine 17, such that heat is received into the gas to which the outer surface 604 is exposed from the platform body 600 at the outer surface 604. Accordingly, the fluid to which the outer surface 604 of the platform body 600 is exposed has a further cooling effect on the platform body 600.

The platform body 600 includes an outer platform boss 609 which extends in a direction which is generally away from the inner surface 602 (i.e., in a direction away from the rotational axis 9 when the stator vane 60 is mounted within a turbine stage of a rotary machine) to, for instance, facilitate mounting of the aerofoil 63 within a turbine stage of the high-pressure turbine 17 described above with reference to FIG. 4. The core aperture 606 is sealed to ensure that the fluid 74, 75 conveyed by the internal fluid passageway 608 cannot exit the internal fluid passageway 608 through the core aperture 606. Means for sealing the core aperture 606 are discussed in detail below with reference to FIG. 6 and FIGS. 7A-7F.

Figure 6:
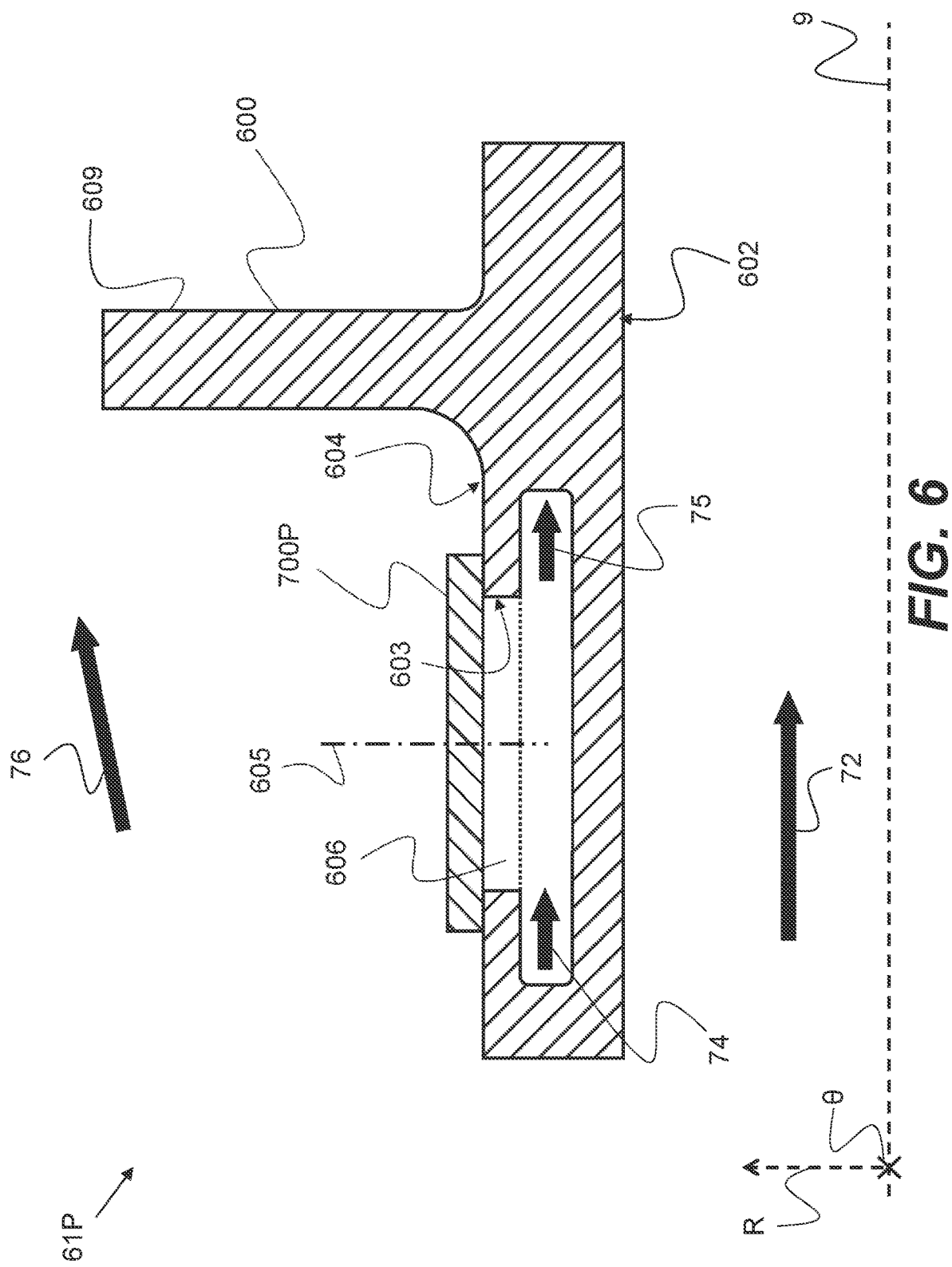
FIG. 6 is a detail view of a previously considered platform suitable for use within the high-pressure turbine of FIG. 4 and/or the stator vane of FIG. 5.

FIG. 6 shows a previously considered outer platform 61P in detail. The platform 61P is generally configured to perform a similar function as the outer platform 61 as described above with reference to FIG. 5, with like reference signs denoting common or similar features. The platform 61P includes a platform body 600 and a cap 700P. The cap 700P is fixed to the platform body 600 and seals the core aperture 606. The sealing of the core aperture 606 provided by the cap 700P ensures that the fluid 74, 75 conveyed by the internal fluid passageway 608 cannot exit the internal fluid passageway 608 through the core aperture 606. The cap 700P overlies the core aperture 606 and is fixed to the outer surface 604 of the platform body 600. The cap 700P may be fixed to the outer surface of the platform body 600 by, for example, a welded joint or a brazed joint. The cap 700P is generally in the form of a plate and is wholly disposed outside of the core aperture 606. Accordingly, a weight of the cap 700P (and therefore a weight of the platform 61P) may be minimised.

Figure 7A:
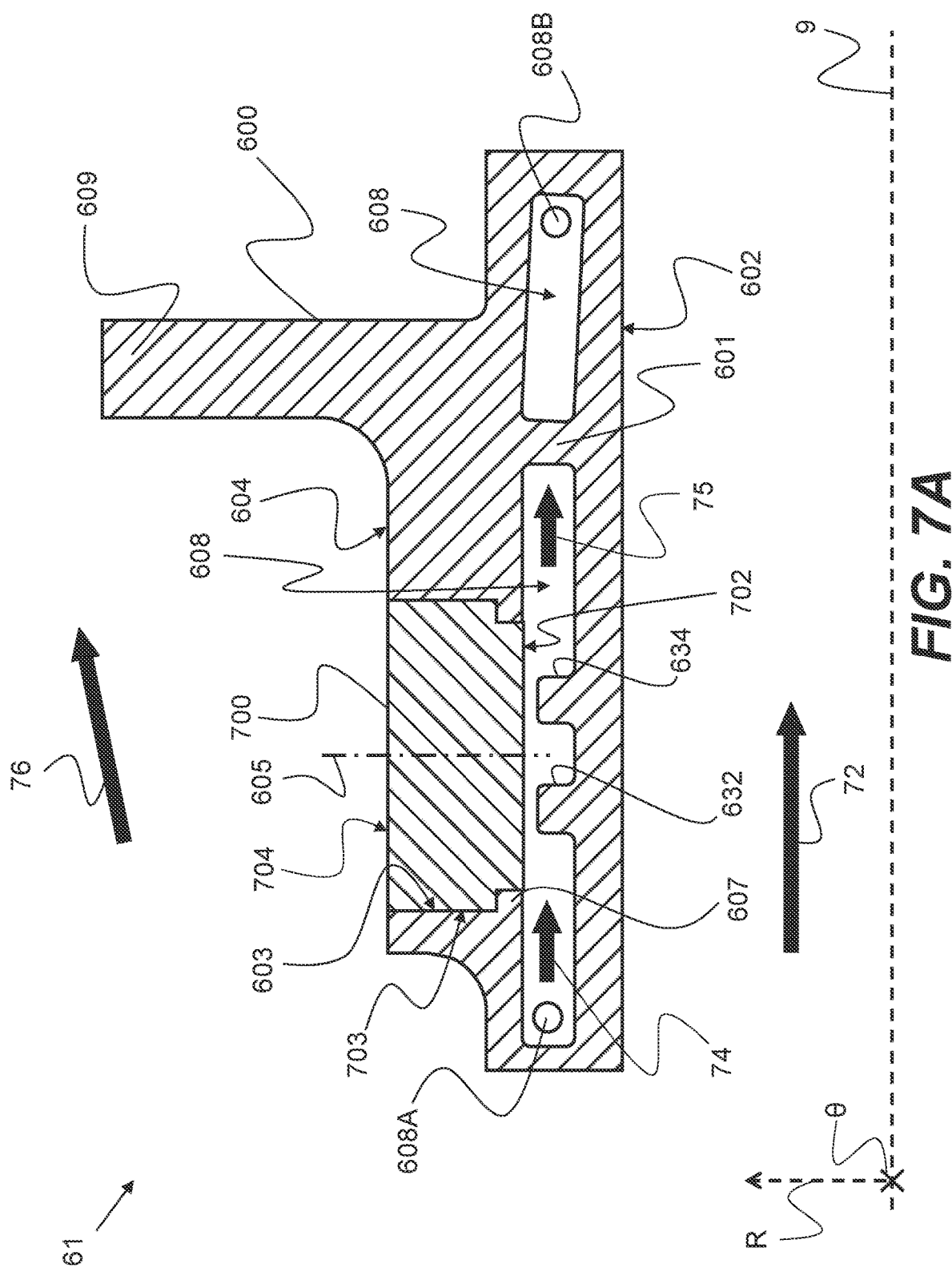
Figure 7B:
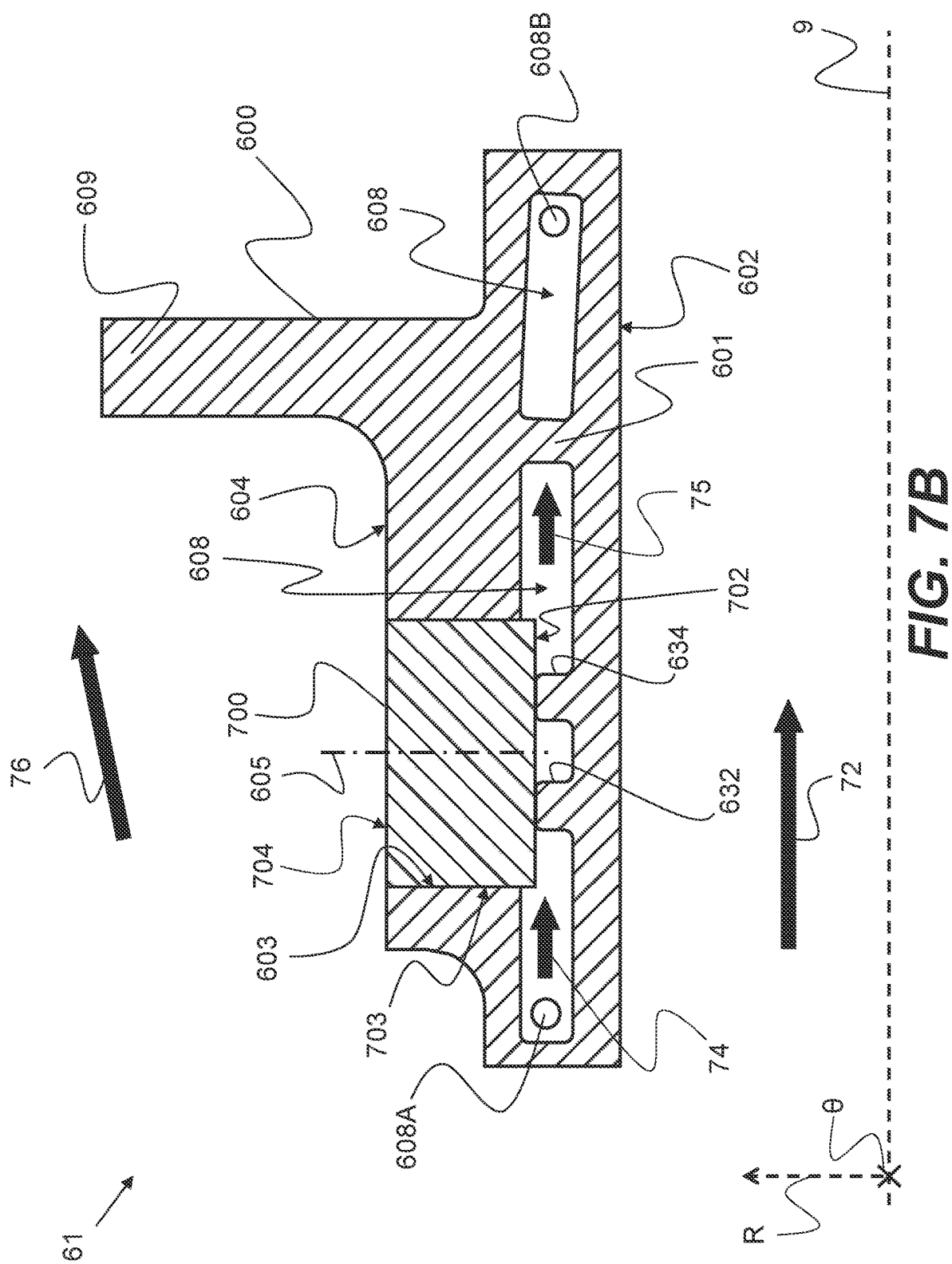
Figure 7C:
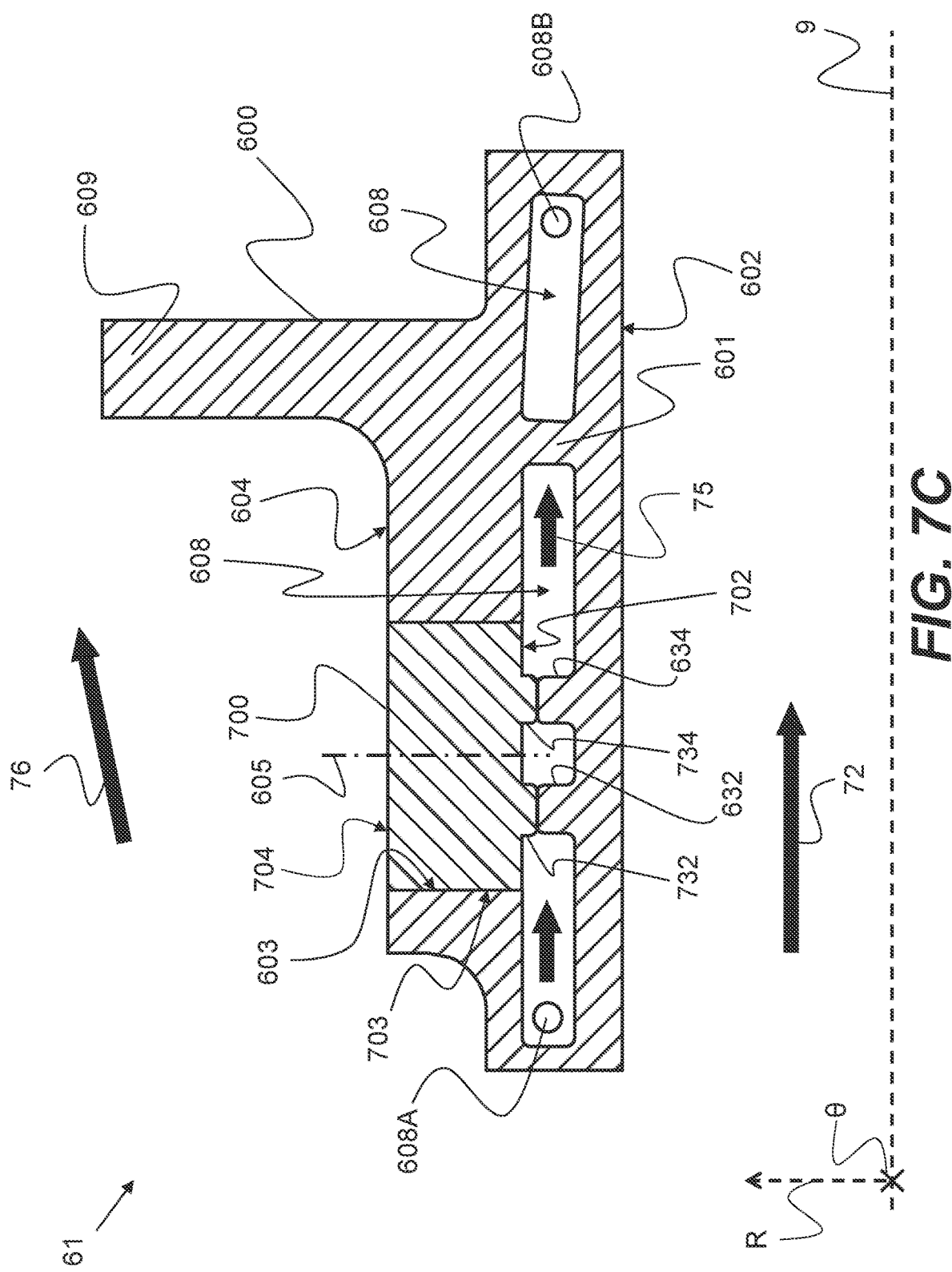
Figure 7E:
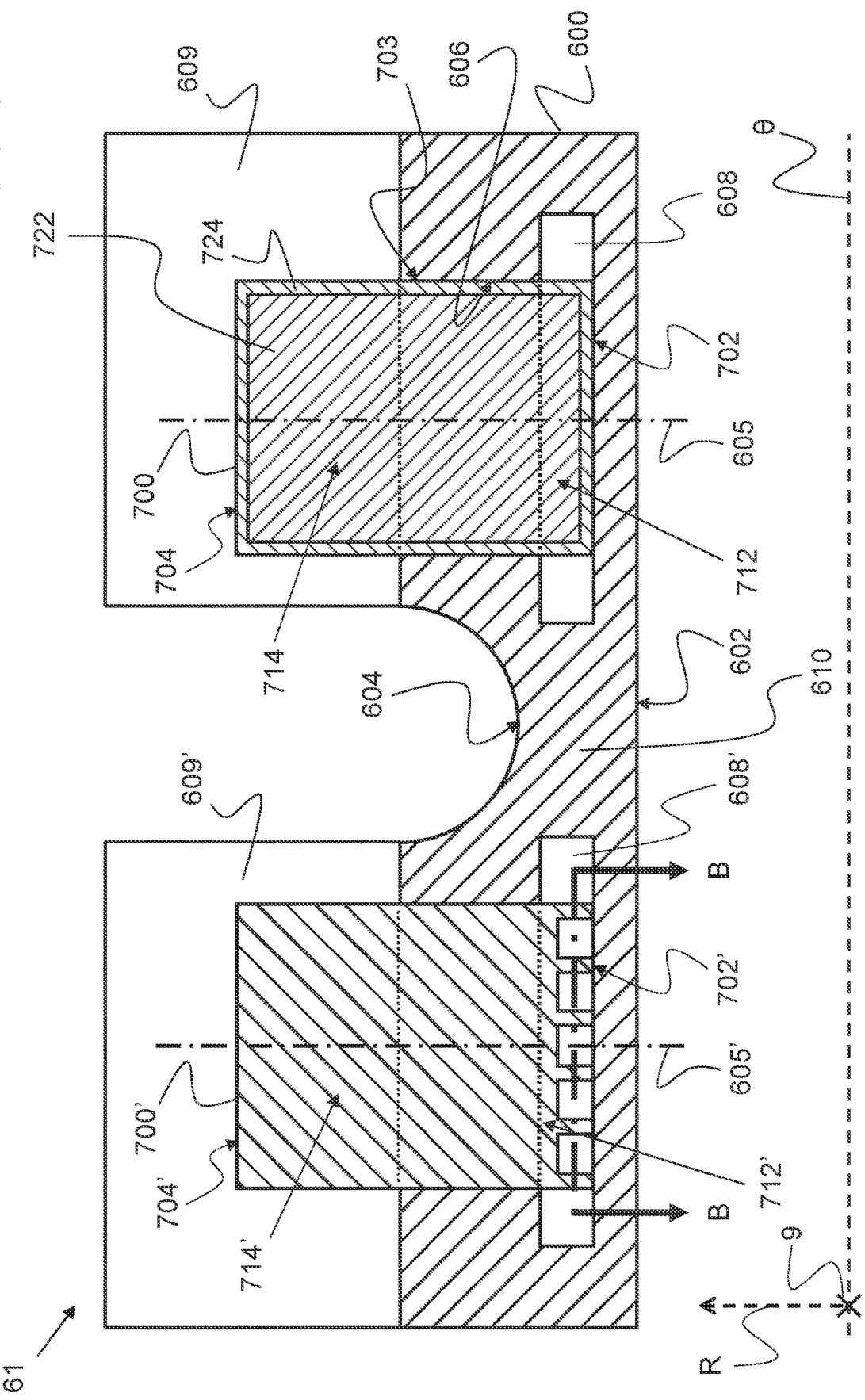

In contrast to the previously considered outer platform 61P, various example outer platforms 61 are now described with reference to FIGS. 7A-7F. FIG. 7A shows a detail view of a first example platform 61, FIG. 7B shows a detail view of a second example platform 61, FIG. 7C shows a detail view of a third example platform 61, whereas FIG. 7D shows a detail view of a fourth example platform 61. FIG. 7E shows a detail sectional view of the fourth example platform 61 through section A-A (as marked on FIG. 7D). FIG. 7F shows a detail sectional view of the fourth example platform 61 through section B-B (as marked on FIG. 7E).

Each example platform 61 is generally configured to hold an aerofoil in place in a similar way to the outer platform 61 as described above with reference to FIG. 5. Each example platform 61 may be incorporated within a stator vane 60 as shown in FIG. 5 and/or a high-pressure turbine 17 as shown in FIG. 4, with like reference signs denoting common or similar features. In particular, each example platform 61 may have any of the features described above with respect to FIG. 5. Otherwise, it will be appreciated that each example outer platform 61 may be incorporated within any suitable type of rotary machine, and/or within a stator vane for any suitable type of rotary machine, such as a turbomachine.

Each example platform 61 includes a platform body 600 and a plug 700. Like the cap 700P described above with respect to FIG. 6, the plug 700 is fixed to the platform body 600 and seals the core aperture 600 so as to prevent fluid 74, 75 conveyed by the internal fluid passageway from exiting the internal fluid passageway 608 through the core aperture 606. Unlike the cap 700P described above with respect to FIG. 6, the plug 700 is at least partially disposed within the core aperture 606 in each example platform 61. Consequently, in each example platform 61, the plug 700 occupies at least a fraction of the core aperture 606 by volume. The plug 700 has an inner surface 702 and an outer surface 704. The inner surface 702 is defined as an external surface of the plug 700 which is relatively proximal to the internal fluid passageway 608 when the plug 700 is inserted into the core aperture 606, whereas the outer surface 702 is defined as an external surface of the plug 700 which is relatively distal to the internal fluid passageway 608 when the plug 700 is inserted into the core aperture 606. In use, the fluid 74, 75 may exchange heat with the plug 700 in additional to exchanging heat with the platform body 600.

Broadly, the plug 700 may be configured to be fixed to the platform body 600 by any suitable means. Advantageously, in any of the examples shown in FIGS. 7A-7F, the plug 700 may be fixed to the platform body 600 by welding or by brazing. As an example, a welded joint may be created between the internal perimeter 603 of the core aperture 606 and an external perimeter 703 of the plug 700. As another example, a brazed joint may be created between the perimeter 603 of the core aperture 606 and the external perimeter 703 of the plug 700. Each of these techniques may provide a strong fixing between the plug 700 and the platform body 600 and good sealing of the core aperture 606.

Otherwise, the plug 700 may be fixed to the platform body 600 by means of an interference fit between the plug 700 and the core aperture 600. As will be appreciated by those skill in the art, the external perimeter 703 of the plug 700 may be dimensioned so as to be slightly larger than the perimeter 603 of the core aperture 606 such that the external perimeter 703 of the plug 700 and the perimeter 603 come into contact with each other when the plug 700 is inserted into the core aperture 606 and thereby become interfering surfaces. This may provide simple and effective means for fixing the plug 700 to the platform body 600, as well as enabling a wider range of materials to be used to form the platform body 600 and/or the plug 700. In addition, a sealant may be adding during manufacturing such that the sealant is disposed between the interfering surfaces of the plug 700 and the platform body 600 when the plug 700 is inserted into the core aperture 606. This may provide better sealing of the core aperture 606.

Optionally, the perimeter 603 of the core aperture 606 is machined to prepare the core aperture 606 for insertion of the plug 700 during a further manufacturing step of the platform 61. Machining of the core aperture 606 may enable better fixing of the plug 700 to the platform body and therefore aid sealing of the core aperture 606 by the fixing of the plug 700 to the platform bod 600.

The internal fluid passageway 608 includes an internal fluid inlet 608A and an internal fluid outlet 608B. The fluid 74, 75 conveyed by the internal fluid passageway 608 is received at the internal fluid inlet 608A and discharged from the internal fluid outlet 608, such that the fluid generally flows from the internal fluid inlet 608A toward the internal fluid outlet 608B along the internal fluid passageway 608. Optionally, the internal fluid inlet 608A is adapted to be fluidically connected to a compressor or a bypass duct of a gas turbine engine in which the platform 61 is incorporated (e.g., the low-pressure compressor 14, the high pressure compressor 15 or the bypass duct 22 of the gas turbine engine 10 described above with reference to FIGS. 1-3). If so, the internal fluid passageway 608 is configured to convey air received from the compressor 14, 15 or the bypass duct 22 to the internal fluid outlet 608B in use. Further, the internal fluid outlet 608B may be adapted to be fluidically connected to a bypass duct 22 of the gas turbine engine, an exhaust nozzle 18 of the gas turbine engine 10 or to a location within a core 11 of the gas turbine engine 10 downstream of the platform 61. Therefore, air received from the compressor 14, 15 is utilised to cool the platform body 600. However, this disclosure anticipates that the internal fluid inlet 608A may otherwise be adapted to be fluidically connected to a dedicated coolant reservoir, such that the internal fluid passageway 608 is configured to, in use, convey coolant received from the coolant reservoir to the internal fluid outlet 608B for subsequent discharge. The coolant may be, for instance, a lubricant oil.

The internal fluid passageway 608 may extend around at least one pillar 601 defined by the platform body 600. The at least one pillar 601 may increase a structural strength of the platform body 600 and/or increase a surface area for heat transfer between the fluid 74, 75 conveyed by the internal fluid passageway 608 and the platform body 600. In each of the examples of FIGS. 7A-7D, the internal fluid passageway 608 extends from the internal fluid inlet 608A, around the pillar 601 and to the internal fluid outlet 608B.

In the examples of FIGS. 7A-7F, the outer platform boss 609 is enlarged (compared to the example of FIG. 6) such that the core aperture 606 extends through part of the outer platform boss 609. This enables the core aperture 606 to be located closer to the internal fluid outlet 608B without adversely affecting the structural characteristics of the outer platform 61. In particular, this enables the core aperture 606 to be located closer to the internal fluid outlet 608B without significantly increasing a difficulty of manufacturing the platform 61 during, for example, a process of shelling the geometry of the platform body 600 during a casting process. In turn, this may permit a greater range of possible design geometries for the platform 61, which may aid the design of a more compact platform 61 (and therefore a more compact stator vane 60 and/or a more compact high-pressure turbine 17). However, the core aperture 606 extending through part of the outer platform boss 609 in this manner means that the core aperture 606 has a greater height (as measured in a direction parallel to the radial direction R) compared to the previously considered platform 61P. If the core aperture 606 were sealed by means of a cap similar to the cap 700P described with respect to the previously considered platform 61P, the entire volume of the core aperture 606 would be exposed to the internal fluid passageway 608. The exposure of the entire volume of the core aperture 606 to the internal fluid passageway 608 may lead to a significant amount recirculation of fluid 74, 75 conveyed by the internal fluid passageway 608 within the core aperture 606.

The plug 700 being at least partially disposed inside the core aperture 606, as shown in each of the examples of FIGS. 7A-7F, reduces recirculation of fluid 74, 75 conveyed by the internal fluid passageway 608 within the core aperture 606. This may be associated with a reduced pressure drop between the internal fluid inlet 608A and the internal fluid outlet 608B, which may in turn be associated with better cooling of the platform 61 and an improved efficiency of a rotary machine (e.g., a gas turbine engine) in which the platform 61 is incorporated. However, the plug 700 being at least partially disposed within the core aperture 606 increases an installation mass of the platform 61. Better cooling of the platform 61 (e.g., by increasing the cooling effect on the platform body 600 provided by the flow of fluid 74, 75 conveyed by the internal fluid passageway 608) may increase a thermal operability range of the platform 61 and therefore a stator vane 60 of which it is a part. In particular, better cooling of the platform 61 may enable a bulk temperature of the fluid 72 inside the high-pressure turbine 17 to be relatively increased without risking thermal damage to the platform 61, which may be associated with improved thermal efficiency of a gas turbine engine 10 in which the high-pressure turbine 17 is incorporated. In particular, if a material (e.g., metal) temperature is relatively high proximal to the internal fluid passageway 608 compared to nearby zones of the stator vane 60 (which may be referred to as a "hot spot") due to any applicable factors affecting the temperature, better cooling of the platform 61 due to reduced recirculation of fluid 74, 75 within the core aperture 606 may be especially advantageous.

In each of the examples of FIGS. 7A-7F, the plug 700 occupies approximately 100% of the core aperture 606 by volume so as to completely eliminate recirculation of fluid 74, 75 conveyed by the internal fluid passageway 608 within the core aperture 606. In other examples, the plug 700 may occupy no less than 90% of the core aperture 606 by volume. In some examples, the plug 700 may occupy no less than 75% of the core aperture 606 by volume. In further examples, the plug 700 may occupy no less than 50% of the core aperture 606 by volume to at least partially eliminate recirculation of the fluid 74, 75 conveyed by the internal fluid passageway 608 within the core aperture 606 without necessarily significantly increasing the installation mass of the platform 61.

In the first example platform 61 shown by FIG. 7A, a internal protrusion 607 is formed within the core aperture 606. The internal protrusion 607 generally extends in a direction away from the perimeter 603 of the core aperture 606 toward the geometrical centreline 607 of the core aperture 606. The internal protrusion 607 may be formed during casting of the platform body 600 and/or during machining of the core aperture 606 as discussed above. An external shape of the plug 700 is shaped so as to correspond to an internal shape of the core aperture 606 (including the internal protrusion 607). Accordingly, when the plug 700 is inserted into the core aperture 606, the plug 700 abuts (e.g., comes into positive contact with) the internal protrusion 607. The positive contact between the internal protrusion 607 and the plug 700 may aid in correct location of the plug 700 within the core aperture 606 during manufacturing of the first example platform 61 and may also enable better fixing of the plug 700 to the platform body 600.

In the second example platform 61 shown by FIG. 7B and the third example platform 61 shown by FIG. 7C, the platform body 600 defines a plurality of protrusions extending into the internal fluid passageway 608. In FIGS. 7B and 7C, the plurality of protrusions includes a first platform body protrusion 632 and a second platform body protrusion 634. However, this disclosure anticipates there being a single protrusion 632 or more than two platform body protrusions. Each platform body protrusion 632, 634 extends away from the inner surface 602 of the platform body 600 toward the outer surface 604 of the platform body 600 along a direction parallel to the radial direction R. In some examples, the platform body protrusions 632, 634 may be shaped to take the form of pins or fins.

The platform body protrusions 632, 634 are generally configured to promote heat transfer between the fluid 74 conveyed by the internal fluid passageway 608 and the platform body 600. The platform body protrusions 632, 634 may be referred to as pedestals. In particular, the platform body protrusions 632, 634 increase a surface area for convective heat transfer between the fluid 74 conveyed by the internal fluid passageway 608 and the platform body 600. Further, the platform body protrusions 632, 634 may incite mixing (e.g., turbulent mixing) of the fluid 74 conveyed by the internal fluid passageway 608 in a region surrounding the platform body protrusions 632, 634 by increasing a tortuosity of a path taken by the fluid 74 through the internal fluid passageway 608. Mixing of the fluid 74 conveyed by the internal fluid passageway 608 in the region surrounding the platform body protrusions 632, 634 may be associated with an increased rate of heat transfer from the platform body 600 to the fluid 74 conveyed by the internal fluid passageway 608. The platform body protrusions 632, 634 may also locally increase a velocity of the fluid 74 conveyed by the internal fluid passageway 608.

In both of FIGS. 7B and 7C, the plug 700 is disposed within the core aperture 606 such that the plug abuts (e.g. is in contact with) the plurality of platform body protrusions 632, 634. The contact between the plurality of platform body protrusions 632, 634 ensures that the fluid 74 conveyed by the internal fluid passageway 608 is prevented from passing over the plurality of platform body protrusions 632, 634 and therefore the fluid 74 must flow around each of the platform body protrusions 632, 634 when being conveyed by the internal fluid passageway 608 from the internal fluid inlet 608A to the internal fluid outlet 608B. This may be associated with increased mixing of the fluid 74 conveyed by the internal fluid passageway 608 in the region surrounding the platform body protrusions 632, 634, which may in turn be associated with an increased rate of heat transfer between the platform body 600 and the fluid 74 conveyed by the internal fluid passageway 608.

In the third example platform 61 of FIG. 7C, the plug 700 includes a plurality of protrusions extending away from the lower surface 702 of the plug 700 and into the internal fluid passageway 608. In FIG. 7C, the plurality of protrusions includes a first plug protrusion 732 and a second plug protrusion 734. However, this disclosure anticipates there being greater than two plug body protrusions or there being only a single plug protrusion 732. The plug protrusions 732, 734 increase a surface area for convective heat transfer between the fluid 74 conveyed by the internal fluid passageway 608 and the plug 700 and therefore promote heat transfer between the fluid 74 conveyed by the internal fluid passageway 608 and the plug 700. Improved heat transfer between the fluid 74 conveyed by the internal fluid passageway 608 and the plug 700 may reduce a temperature of the fluid 74, which may result in improved heat transfer between the fluid 74 and the platform body 600 and therefore increase the cooling effect on the platform body 600 provided by the fluid 74 conveyed by the internal fluid passageway 608.

Further, in the third example platform 61 of FIG. 7C, each of the plurality of plug protrusions 732, 734 overlie and abut a corresponding platform body protrusion 632, 634. This increases surface area for convective heat transfer between the fluid 74 conveyed by the internal fluid passageway 608 and the plug 700 as well as inciting mixing (e.g., turbulent mixing) of the fluid 74 conveyed by the internal fluid passageway 608 in a region surrounding the plug protrusions 732, 734. Consequently, each of the plug protrusions 732, 734 abutting a corresponding platform body protrusion 632, 634 may further promote heat transfer between the fluid 74 conveyed by the internal fluid passageway 608 and the plug 700. In examples in which there is only a single plug protrusion 732, the plug protrusion 732 overlies and abuts the platform body protrusion 632.

In the fourth example platform 61 shown by FIG. 7D, the plug 700 extends outside of the core aperture 606. In particular, a lower portion 712 of the plug 700 extends into the internal fluid passageway 608 and an upper portion 714 of the plug 700 extends away from the outer surface 604 of the platform body 600. When the outer platform 61 is incorporated within a rotary machine, the lower portion 712 of the plug is relatively proximal to the rotational axis 9, whereas the upper portion 714 of the plug 700 is relatively distal to the rotational axis 9.

The plug 700 extending outside of the core aperture 606 generally results in improved heat transfer between the fluid 74, 75 conveyed by the internal fluid passageway 608 and the fluid to which the outer surface 604 of the platform body 600 is exposed. As a result, the cooling effect on the platform body 600 provided by the fluid 74, 75 conveyed by the internal fluid passageway 608 may be increased, with various associated advantages as discussed above. In the example of FIGS. 7D and 7E, the both the lower portion 712 of the plug 700 extends into the internal fluid passageway 608 and the upper portion 714 of the plug 700 extends away from the outer surface 604 of the platform body 600. However, this need not necessarily be the case. In other examples, it may be that only the lower portion 712 of the plug extends into the internal fluid passageway 608 or only the upper portion 714 of the plug 700 extends away from the outer surface 604.

The lower portion 712 of the plug 700 extending into the internal fluid passageway 608 may facilitate heat reception from the fluid 74, 75 conveyed by the internal fluid passageway 608 into the plug 700 by providing an increased surface area for the heat transfer therebetween. In turn, this may promote heat rejection from the plug 700 into the fluid to which the outer surface 604 of the platform body 600 is exposed due to an increased temperature of the plug 700, which may result in increased convective heat transfer between the plug 700 and the fluid to which the outer surface 604 is exposed. However, the lower portion 712 of the plug 700 being disposed within (e.g., extend into) the internal fluid passageway 608 may increase a resistance to flow of the fluid 74, 75 within the internal fluid passageway 608, which may result in a larger pressure drop across the internal fluid inlet 608A and the internal fluid outlet 608B and therefore useful energy losses through the internal fluid passageway 608.

Nevertheless, the larger pressure drop across the internal fluid inlet 608A and the internal fluid outlet 608B may be associated with some advantages. For instance, the larger pressure drop across the internal fluid inlet 608A and the internal fluid outlet 608B may reduce a Mach number of the fluid 74 being discharged from the internal fluid outlet 608B. If the fluid being discharged from the internal fluid outlet 608B has a high Mach number, the fluid 74 being discharged from the internal fluid outlet 608B may become choked or a shock wave may develop within the fluid 74 inside the internal fluid passageway 608. Both of these phenomena have the effect of limiting mass-flow through the internal fluid outlet 608B and therefore reducing a flow rate of the fluid 74 through the internal fluid passageway 608, which in turn limits the cooling effect provided by the fluid 74 conveyed by the internal fluid passageway 608 to the platform body 600. In addition, it may be that the internal fluid outlet 608B is configured to discharge the fluid 74 conveyed by the internal fluid passageway 608 into a turbine stage of a rotary machine (e.g., a gas turbine engine). The larger pressure drop across the internal fluid inlet 608A and the internal fluid outlet 608B reduces the pressure of fluid 74 discharged from the internal fluid outlet 608B, which reduce losses within the turbine stage of the gas turbine engine. In particular, it may be that the internal fluid outlet 608B is configured to discharge the fluid 74 conveyed by the internal fluid passageway 608 into the turbine stage of a rotary machine for the purpose of film cooling. A reduced pressure of the fluid 74 discharged from the internal fluid outlet 608B may reduce a probability of flow detachment from a surface to which the fluid 74 discharged from the internal fluid outlet 608B is configured to provide film cooling.

In addition, a mass of the plug 700 (and therefore a mass of the platform 61) is relatively increased by the lower portion 712 of the plug 700 being disposed within the internal fluid passageway 608. Nevertheless, the benefits associated with improved heat transfer between the fluid 74, 75 conveyed by the internal fluid passageway 608 and the fluid to which the outer surface 604 of the platform body 600 is exposed may generally outweigh any drawbacks associated with the larger pressure drop across the internal fluid inlet 608A and the internal fluid outlet 608B as well as the increased installation mass of the platform 61.

In the particular example of FIGS. 7D and 7E, the lower portion 712 of the plug extends into the internal fluid passageway 608 such that the inner surface 702 of the plug 700 abuts an opposing surface of the internal fluid passageway 608. This ensures that all of the fluid 74, 75 conveyed by the internal fluid passageway 608 must flow around the lower portion 712 of the plug 700, which may provide increased heat transfer therebetween at the cost of increased resistance to flow of the fluid 74, 75 conveyed by the internal fluid passageway 608. However, in other examples, the lower portion 712 of the plug may only partially extend into the internal fluid passageway 608 such that the inner surface of the plug 702 is offset from the opposing surface of the internal fluid passageway 608. This may be associated with lower resistance to flow of the fluid 74, 75 conveyed by the internal fluid passageway 608 while providing an increased surface area for heat transfer.

The upper portion 714 of the plug 700 extending away from the outer surface 604 facilitates heat rejection from the plug 700 to the fluid to which the outer surface 604 of the platform body 600 is exposed by providing an increased surface area for the heat transfer therebetween. In a similar way to the lower portion 712 discussed above, the upper portion 714 of the plug 700 extending away from the outer surface 604 of the platform body 600 increases a resistance to any flow of the fluid to which the outer surface 604 is exposed. In addition, a mass of the plug 700 (and therefore a mass of the platform 61) is relatively increased. Nevertheless, the benefits associated with improved heat transfer between the fluid 74, 75 conveyed by the internal fluid passageway 608 and the fluid to which the outer surface 604 of the platform body 600 is exposed may generally outweigh the drawbacks associated with the increased resistance to flow of the fluid 76 flowing over the outer surface 604 as well as the increased installation mass of the platform 61.

The fluid 74, 75 within the internal fluid passageway 608 is subject to convective heating between the internal fluid inlet 608A and the internal fluid outlet 608B due to the relatively hot fluid 72 flowing over the inner surface 602 of the platform body 600. Such convective heating results in a bulk temperature of the fluid 74, 75 increasing as the fluid is conveyed from the internal fluid inlet 6087A to the internal fluid outlet 608B. Consequently, during operation, the bulk temperature of the fluid 74 upstream of the core aperture 606 is typically significantly lower than the bulk temperature of the fluid 75 downstream of the core aperture 606. It follows that a temperature of the lower portion 712 of the plug 700 proximal to the internal fluid inlet 608A is lower than a temperature of the lower portion 712 of the plug 700 relatively proximal to the internal fluid outlet 608B during operation.

The plug 700 is characterised by an effective thermal conductivity. The effective thermal conductivity of the plug 700 is related to the structural arrangement and the material composition of the plug 700. In general, the effective thermal conductivity of the plug 700 may be relatively high. In particular, the effective thermal conductivity of the plug 700 may be greater than an effective thermal conductivity of the platform body 600. A high effective thermal conductivity of the plug 700 promotes thermal conduction throughout the plug 700. Accordingly, a difference in the temperature of the lower portion 712 of the plug 700 proximal to the internal fluid inlet 608A and the temperature of the lower portion 712 of the plug 700 proximal to the internal fluid outlet 608A may be decreased. That is to say that the temperature of the lower portion 712 of the plug 700 proximal to the internal fluid outlet 608B is relatively decreased whereas the temperature of the lower portion 712 of the plug 700 proximal to the internal fluid inlet 608A is relatively increased. In other words, a uniformity of the temperature of the plug 700 around the lower portion 712 of the plug 700 may be increased.

An increased temperature uniformity throughout the lower portion 712 of the plug 700 may lead to an increased average difference between the temperature of the plug 700 and the temperature of the fluid 74, 75 conveyed by the internal fluid passageway 608 over the surface area of the plug 700 which is exposed to the fluid 74, 75 within the internal fluid passageway 608. This increased average temperature difference may result in better convective heat transfer between the fluid 74, 75 conveyed by the internal fluid passageway 608 and the plug 700, which may in turn enhance the cooling effect provided to the platform body 600 by the internal fluid passageway 608. This may also result in especially improved heat reception into the plug 700 from the fluid 74, 75 in the lower portion 712 of the plug 700 relatively proximal to the internal fluid outlet 608B.

In addition, a relatively high effective thermal conductivity of the plug 700 may result in an increased temperature uniformity throughout the plug 700, including within the upper portion 714 as applicable. This may promote heat exchange between the plug 700 and the fluid to which the outer surface 604 of the platform body 600 is exposed due to an increased average temperature difference therebetween, which further enhances the cooling effect provided to the platform body 600 by the internal fluid passageway 608. To promote thermal conduction throughout the plug 700, the effective thermal conductivity of the plug 700 may be no less than 50 W m$^{-1}$ K$^{-1}$ at 293 K and at atmospheric pressure. Optionally, the effective thermal conductivity of the plug 700 may be no less than 100 W m$^{-1}$ K$^{-1}$ at 293 K and at atmospheric pressure or no less than 200 W m$^{-1}$ K$^{-1}$ at 293 K and at atmospheric pressure.

The plug 700 may comprise a plug body 722 which is coated with a thermal coating 724, as shown in the examples of FIGS. 7D and 7E. An effective thermal conductivity of the thermal coating 724 is greater than an effective thermal conductivity of the plug body 722. Therefore, the provision of the thermal coating 724 to the plug 700 may increase thermal conduction around a periphery of the plug 700. In a similar way to as described above, this results in a uniformity of the temperature of the plug 700 around a periphery of the plug 700 being relatively increased. Further, use of a specially selected thermal coating 724 for the purpose of increasing the uniformity of the temperature of the plug 700 around the periphery of the plug 700 allows a material for the plug body 722 to be selected according to other design criteria, which may result in a reduced installation mass of the platform 61, for example.

To promote thermal conduction around the periphery of the plug 700, the effective thermal conductivity of the thermal coating 724 may be no less than 100 W m$^{-1}$ K$^{-1}$ at 293 K and at atmospheric pressure. Optionally, the effective thermal conductivity of the thermal coating 724 may be no less than 200 m$^{-1}$ K$^{-1}$ at 293 K and at atmospheric pressure or no less than 400 m$^{-1}$ K$^{-1}$ at 293 K and at atmospheric pressure. More generally, the effective thermal conductivity of the thermal coating 724 may be at least 50 m$^{-1}$ K$^{-1}$ greater than the effective thermal conductivity of the plug body 722 at 293 K and at atmospheric pressure.

In addition, or instead, an effective thermal emissivity of the thermal coating 724 may be greater than an effective thermal emissivity of the plug body 722. Therefore, the provision of the thermal coating 724 to the plug 700 may increase thermal radiation from the periphery of the plug 700 into the fluid 76 to which the outer surface 604 of the platform body 600 is exposed and/or to any other nearby components of a rotary machine in which the platform 61 is incorporated. To promote thermal radiation from the periphery of the plug 700, the effective thermal emissivity of the thermal coating 724 may be no less than 0.05, and optionally no less than 0.1 or no less than 0.8.

The platform body 600 of any of the example platforms 61 in accordance with the present disclosure may define a plurality of internal fluid passageways 608 and a corresponding plurality of core apertures 606, each core aperture extending from the outer surface 604 of the platform body 600 to a respective internal fluid passageway 608. Each core aperture 606 may be sealed by a respective plug 700. Each internal fluid passageway 608, core aperture 606 and respective plug 700 may have any of the features described herein as appropriate and applicable. The platform body 600 defining a plurality of internal fluid passageways 608 may increase a total cooling effect which may be provided to the platform body 600 in use.

In the fourth example platform 61, as seen in FIG. 7E, the platform body 600 defines a plurality of internal fluid passageways and plurality of core apertures. The plurality of internal fluid passageways includes the internal fluid passageway 608 and a further internal fluid passageway 608', while the plurality of core apertures includes the core aperture 606 and a further core aperture 606'. Like the internal fluid passageway 608, the further internal fluid passageway 608' is disposed between the inner surface 602 and the outer surface 604 and is generally configured to convey a further fluid 74', 75' therethrough for the purpose of heat exchange with the platform body 600 and/or the further plug 700'. The internal fluid passageway 608 may be separated from the further internal fluid passageway 608' by a septum wall 610 defined by the platform body 600, such that the fluid 74, 75 conveyed by the internal fluid passageway 608 does not mix with the further fluid 74', 75' conveyed by the internal fluid passageways 608' along the length of each internal fluid passageway. The further core aperture 606' extends from the outer surface 604 to the further internal fluid passageway 608'. The platform 61 includes a further plug 700'. In a similar way to the plug 700, the further plug 700' is fixed to the platform body 600 and seals the further core aperture 606'. More generally, the further plug 700' may have any of the features of the plug 700 described above with reference to FIGS. 7A-7D.

The further plug 700' is generally similar to the plug 700, with like reference signs differentiated by the prime (') symbol denoting similar or common features. However, the plug 700 and the further plug 700' may have some dissimilar features, as in the example of FIGS. 7D-7E. Otherwise, this disclosure envisages that the plug 700 and the further plug 700' have substantially identical features. Further, although both of the plug 700 and the further plug 700' are partially disposed outside the respective core apertures 606, 606' in the example of FIG. 7E, this need not necessarily be the case. For instance, it may be that neither only one of the plug 700 and the further plug 700' are partially disposed outside of the respective core aperture 606, 606'.

In the specific example of FIG. 7E, the further plug 700' differs from the plug 700 in that the lower portion 712' of the plug defines a plurality of heat exchange channels 741'-745'. FIG. 7F shows a cross section of the further plug 700' through section B-B as marked on FIG. 7E. In the example of FIGS. 7E-7F, the lower portion 712' of the plug defines five heat exchange channels, including a first heat exchange channel 741', a second heat exchange channel 742', a third heat exchange channel 743', a fourth heat exchange channel 744' and a fifth heat exchange channel 745'. However, the lower portion 712' of the further plug 700' may have any suitable number of heat exchange channels 741'-745'. Each heat exchange channel 741'-745' is defined by at least one fin 751'-754' and 761'-762', with each heat exchange channel 741'-745' being separated by an internal fin 751'-754'. In this example, the first heat exchange channel 741' is defined by a first external fin 761' and a first internal fin 751' while the fifth heat exchange channel 745' is defined by a second external fin 762' and the fourth internal fin 754'. In other examples, the external fins 761'-762' may not be present, such that the first heat exchange channel 741' is only defined by the first internal fin 751' and the fifth heat exchange channel 745' is only defined by the fourth external fin 754'.

As best seen in FIG. 7F, each heat exchange channel 741'-745' has a respective inlet 741A'-745A' configured to receive fluid 74' from the internal fluid inlet 608A and a respective outlet 741B'-745B' configured to discharge fluid 75' to the internal fluid outlet 608B. Each heat exchange channel 741'-745' is configured to convey fluid received from the respective inlet 741A'-745A' to the respective outlet 741A'-745A' for heat exchange with the further plug 700' therein. In the example of FIG. 7F, each internal fin 751'-754' has a non-linear shape (e.g., a zig-zag shape) which increases a surface area for heat transfer between fluid conveyed through the respective heat exchange channel 741'-745' and the further plug 700'. However, in other examples, each internal fin may have another shape (e.g., a linear shape).

The lower portion 712' defining the plurality of heat exchange channels 741'-745' generally promotes and improves heat exchange between the fluid 74', 75' conveyed by the further internal fluid passageway 608' and the further plug 700'. Therefore, the cooling effect on the platform body 600 provided by the fluid 74', 75' conveyed by the further internal fluid passageway 608' may be increased as a result of better heat transfer between the fluid 74', 75' conveyed by the further internal fluid passageway 608' and the fluid to which the outer surface 604 is exposed.

It should be appreciated that the plug 700 (as described with reference to FIG. 7D) may have any of the features described above in respect of the further plug 700' with reference to FIGS. 7E and 7F. For instance, the lower portion 712 of the plug 700 may similarly define a plurality of heat exchange channels in a similar way to the lower portion 712' of the plug 700'. In addition, the further plug 700' and the plug 700 may be joined by a suitable bridging portion to form a combined plug structure. This may reduce a complexity of assembly of the platform 61 during manufacture and/or further promote heat transfer between the plug 700 (and the further plug 700') and the gas to which the outer surface 604 is exposed.

Although the plug 700 has been described as being fixed to the platform body 600 and sealing the core aperture 606, this need not necessarily be the case. For example, it may be that the platform body 600 comprises a cap like the cap 700P described above with reference to FIG. 6. If so, the cap may be fixed to the platform body 600, seal the core aperture 606, and retain the plug 700 within the core aperture 606 such that the plug 700 is secured to the platform body 600 (by the cap). The cap may be fixed to the platform body 600 by a welded joint or a brazed joint. If so, the plug 700 may not seal the core aperture 606 (with the sealing provided by the cap being relied upon instead).

Figure 8:
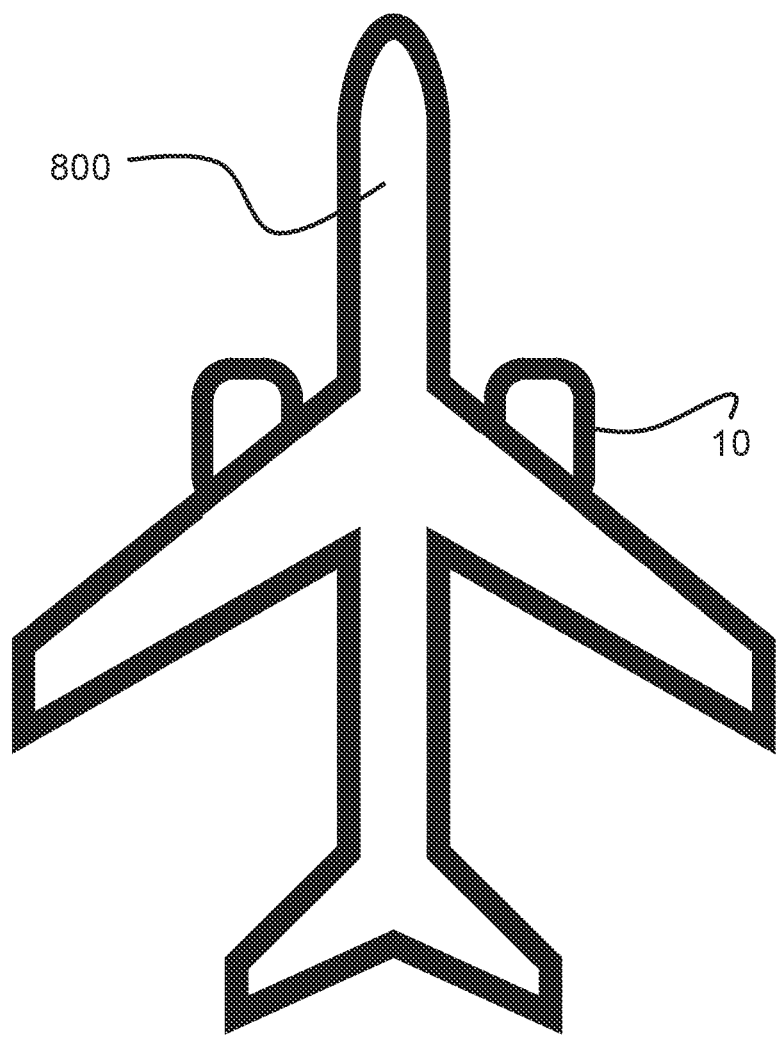
FIG. 8 is a top view of an example aircraft.

FIG. 8 shows a highly schematic top view of an aircraft 800 comprising a gas turbine engine 10. The gas turbine engine 10 comprises a platform 61 in accordance with the platform 61 described above with reference to FIGS. 7A-7F. The platform 61 may be included in a stator vane 60 as described above with reference to FIG. 5, and the platform 61 (and the stator vane 60, if applicable) may be included within a turbine stage 17 in accordance with that described above in reference to FIG. 4. Otherwise, the gas turbine 10 may generally be in accordance with the gas turbine engine 10 described above with reference to FIGS. 1-3.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combina-

What is claimed is:

1. A platform for a stator vane, the platform including a platform body, a plug, and a further plug, wherein
the platform body defines:
an inner surface,
an outer surface offset from the inner surface,
an internal fluid passageway disposed between the outer surface and the inner surface,
a further internal fluid passageway disposed between the outer surface and the inner surface,
a further core aperture extending from the outer surface to the further internal fluid passageway, and
a core aperture extending from the outer surface to the internal fluid passageway;
the plug is configured to be secured to the platform body;
the plug:
is a single integral component,
is configured to be partially disposed inside the core aperture and extend outside of the core aperture whilst secured to the platform body for improved heat transfer between a fluid conveyed by the internal fluid passageway and a fluid to which the outer surface is exposed, and
extends outside of the core aperture into the internal fluid passageway;
the further plug is configured to be secured to the platform body and seal the further core aperture; and
the further plug is configured to be partially disposed inside the further core aperture and partially disposed outside the further core aperture whilst secured to the platform body for improved heat transfer between a fluid conveyed by the further internal fluid passageway and the fluid to which the outer surface of the platform body is exposed.

2. The platform of claim 1, wherein a lower portion of the plug is configured to extend into the internal fluid passageway whilst secured to the platform body to facilitate heat reception from the fluid conveyed by the internal fluid passageway.

3. The platform of claim 2, wherein the lower portion of the plug defines a plurality of heat exchange channels for improved heat exchange between the fluid conveyed by the internal fluid passageway and the plug.

4. The platform of claim 1, wherein an upper portion of the plug is configured to extend away from the outer surface of the platform body whilst the plug is secured to the platform body to facilitate heat rejection to the fluid to which the outer surface of the platform body is exposed.

5. The platform of claim 1, wherein an effective thermal conductivity of the plug is greater than an effective thermal conductivity of the platform body.

6. The platform of claim 5, wherein the effective thermal conductivity of the plug is no less than 50 W m$^{-1}$ K$^{-1}$ at 293 K and at atmospheric pressure.

7. The platform of claim 1, wherein:
the plug comprises a plug body;
the plug body is coated with a thermal coating; and
an effective thermal conductivity of the thermal coating is greater than an effective thermal conductivity of the plug body.

8. The platform of claim 7, wherein the effective thermal conductivity of the thermal coating is no less than 100 W m$^{-1}$ K$^{-1}$ at 293 K and at atmospheric pressure.

9. The platform of claim 1, wherein:
the plug comprises a plug body;
the plug body is coated with a thermal coating; and
an effective thermal emissivity of the thermal coating is greater than an effective thermal emissivity of the plug body.

10. The platform of claim 9, wherein the effective thermal emissivity of the thermal coating is no less than 0.05.

11. The platform of claim 1, wherein the plug is configured to occupy no less than 50% of the core aperture by volume whilst secured to the platform body to at least partially eliminate recirculation of the fluid conveyed by the internal fluid passageway within the core aperture.

12. The platform of claim 11, wherein the plug is configured to occupy no less than 75% of the core aperture by volume.

13. The platform of claim 1, wherein the core aperture is formed as a result of casting of the platform body over a supporting structure.

14. The platform of claim 1, wherein the plug is configured to be fixed to the platform body and seal the core aperture.

15. The platform of claim 1, wherein the plug and the further plug are joined by a bridging portion to form a combined plug structure.

16. A stator vane comprising an aerofoil fixed to the platform of claim 1.

17. A turbine stage for a gas turbine engine, the turbine stage comprising the platform of claim 1, or the stator vane comprising the aerofoil fixed to the platform of claim 1.

18. A gas turbine engine comprising the platform of claim 1, the stator vane comprising the aerofoil fixed to the platform of claim 1, or the turbine stage for a gas turbine engine, the turbine stage comprising the platform of claim 1, or the stator vane comprising the aerofoil fixed to the platform of claim 1, wherein the internal fluid passageway is configured to convey air received from a compressor stage of the gas turbine engine.

19. An aircraft comprising the gas turbine engine of claim 18.

20. The platform of claim 1, wherein the platform body includes protrusions in contact with the plug.

21. A platform for a stator vane, the platform including a platform body and a plug, wherein the platform body defines: an inner surface, an outer surface offset from the inner surface, an internal fluid passageway disposed between the outer surface and the inner surface, and a core aperture extending from the outer surface to the internal fluid passageway; the plug is configured to be secured to the platform body; the plug: is a single integral component, is configured to be partially disposed inside the core aperture and extend outside of the core aperture whilst secured to the platform body for improved heat transfer between a fluid conveyed by the internal fluid passageway and a fluid to which the outer surface is exposed, and extends outside of the core aperture into the internal fluid passageway; and the platform body includes protrusions in contact with the plug.

* * * * *